United States Patent [19]

Bruce et al.

[11] Patent Number: 4,538,458
[45] Date of Patent: Sep. 3, 1985

[54] TEMPERATURE COMPENSATED GAS METERS

[75] Inventors: Daniel E. Bruce, Turtle Creek; John L. Esola, Falls Creek, both of Pa.

[73] Assignee: Rockwell International Corporation, Pittsburgh, Pa.

[21] Appl. No.: 526,733

[22] Filed: Aug. 26, 1983

[51] Int. Cl.³ .................. G01F 3/22; G01F 15/04
[52] U.S. Cl. ........................................ 73/233; 73/281
[58] Field of Search .............. 73/197, 204, 233, 266, 73/268, 708, 861.01, 281; 374/204–207; 74/600

[56] References Cited

U.S. PATENT DOCUMENTS

| | | | |
|---|---|---|---|
| 1,032,384 | 7/1912 | Dixon | 73/708 |
| 1,313,333 | 8/1919 | Roesch | 73/708 |
| 2,088,270 | 7/1937 | McCandless | 73/233 |
| 2,116,296 | 5/1938 | Zachariassen et al. | 73/268 X |
| 2,177,085 | 10/1939 | Wagner | 73/233 |
| 2,387,909 | 10/1945 | Ingham, Jr. | 73/708 |
| 2,544,665 | 3/1951 | Gilmore | 73/268 X |
| 2,628,501 | 2/1953 | Knapp | 73/708 X |
| 2,753,712 | 7/1956 | Douglas | 73/281 |
| 2,756,594 | 7/1956 | Hall | 374/205 X |
| 2,778,224 | 1/1957 | Douglas | 73/281 |
| 2,912,859 | 11/1959 | Douglas | 73/281 |
| 2,942,497 | 6/1960 | Berck | 73/233 X |
| 3,069,927 | 12/1962 | Douglas et al. | 74/600 |
| 3,119,264 | 1/1964 | St. Clair | 73/281 |
| 3,132,513 | 5/1964 | Heffernan et al. | 73/281 |
| 3,154,949 | 11/1964 | Smith et al. | 73/708 |
| 3,166,937 | 1/1965 | Farrell | 73/233 |
| 3,177,713 | 4/1965 | Hutchison et al. | 73/281 |
| 3,177,714 | 4/1965 | Mayeran | 73/281 |
| 3,216,253 | 11/1965 | Green | 73/233 |
| 3,253,464 | 5/1966 | Evans et al. | 73/281 |
| 3,266,324 | 8/1966 | Jewell | 73/233 X |
| 3,358,506 | 12/1967 | Rose | 73/233 |
| 3,362,223 | 1/1968 | Stewart | 73/281 |
| 3,371,532 | 3/1968 | Anderson | 73/281 |
| 3,415,712 | 12/1968 | Barker, Jr. | 374/205 X |
| 4,040,296 | 8/1977 | Douglas | 73/281 |
| 4,214,474 | 7/1980 | Bleidt et al. | 73/708 X |

FOREIGN PATENT DOCUMENTS

| | | | |
|---|---|---|---|
| 515499 | 8/1954 | Belgium | 374/204 |
| 920621 | 11/1954 | Fed. Rep. of Germany | 374/204 |
| 438455 | 11/1935 | United Kingdom | 374/204 |
| 788645 | 1/1958 | United Kingdom | 374/205 |

*Primary Examiner*—Robert Spitzer

[57] ABSTRACT

A temperature compensator for gas meters is comprised of two serially connected bi-metallic elements extending between the tangent post and the drive shaft from the flow responsive element. The bimetallic elements are reversely oriented whereby each element responds to a given temperature change to produce movement in the same direction as the other with respect to the axis of the drive shaft.

8 Claims, 3 Drawing Figures

TEMPERATURE COMPENSATED GAS METERS

BACKGROUND OF THE INVENTION

1. Field of the Invention

This invention relates to gas meters and, particularly, temperature compensated gas meters which provide an accurate indication of energy delivered to the customer throughout wide variations in the temperature of the gas being metered.

2. Description of the Prior Art

It is well known in the gas metering art that the energy content of a given volume of gas will vary significantly with changes in the temperature of the gas. As the temperature rises, the gas expands and the energy content or heating value of a one cubic foot of gas will be less at 80° F. than it is at 60° F. Since residential gas meters are often times installed outside of the residence, they are exposed to wide variations of ambient temperature which would cause significant variations in the energy content delivered to the customer for a given volume of gas registered on the meter. Thus, it has become an established practice in the art to include compensating means in the meter which provides an accurate indication of energy delivered to the customer throughout wide variations in the ambient temperature.

This may be done in either one of two different ways; by adjusting the displacement of the meter or the amount of gas passed through it for a given volumetric reading on the register, or by adjusting the reading on the register for a given amount of gas passed through the meter. This invention is concerned with the former approach.

A conventional domestic gas meter is disclosed in U.S. Pat. No. 2,544,655 to E. R. Gilmore. In such meters, the gas passes through expansible bellows or diaphragm chambers, the movable walls of which are connected to flag rods oscillated or rocked back and forth about their axes by the motion of the diaphragms. The flag rods, in turn, are connected through linkages to a tangent post on a tangent arm which rotates a drive shaft to drive the volume indicating register and to drive the control valves for admitting and discharging gas to and from the diaphragm chambers. The tangent arm is a crank which drives a drive shaft about a fixed axis and the effective length from the axis of the drive shaft to the tangent post where it is connected to the flag rod linkage is usually manually adjustable to provide means for calibrating the meters at assembly. The length of the tangent arm determines the arc of oscillation of the flag rods which, in turn, controls the stroke of the bellows or diaphragms and, therefore, the volume of gas passed through the meter for each revolution of the crank arm about the axis of the drive shaft. Thus, if the radius of the circular path through which the tangent post orbits is varied in accordance with temperature changes, the amount of gas passed through the meter for a one revolution of the tangent arm and tangent post will be varied.

Various means for automatically adjusting the radius of the orbital path of movement of the tangent post in accordance with temperature changes have been proposed in the prior art. All of the following patents show typical compensating arrangements and all employ bimetallic elements as the temperature responsive elements.

U.S. Pat. Nos. 3,119,264 and 3,132,513 both show two bimetallic elements connected in parallel between the tangent post and the valve drive shaft, the bimetals being responsive to temperature changes to automatically vary the distance between the tangent post and the valve drive shaft.

U.S. Pat. Nos. 2,912,859 and 4,040,296 show nested, multiple, parallel bimetals to provide rigidity in the drive from the tangent post to the valve control shaft.

U.S. Pat. Nos. 2,778,224; 2,753,712; 3,069,927 and 3,253,464 show various arrangements of bimetallic temperature sensing elements to vary the distance between the tangent post and the axis of the control shaft.

U.S. Pat. Nos. 3,177,713; 3,177,714; 3,362,223 and 3,371,532 all show bimetallic temperature compensating devices for three chamber gas meters where the temperature compensating device is located in the chamber between the two diaphragms.

All of the above listed patents disclose effective means for adjusting the radius of the orbital path of movement of the tangent post about the axis of the drive shaft. However, in each case, the proposed arrangement is either unnecessarily complicated, expensive to manufacture or presents other problems. For example, it is highly desirable to maintain as linear as possible the radial path of movement along which the tangent post is adjusted toward and away from the axis about which it rotates. In U.S. Pat. Nos. 3,119,264 and 3,132,513 this is done by providing two essentially complete bimetallic loops in parallel with each other so that any tendency for the travel imparted by one loop to depart from a linear radial path is opposed by the other parallel loop.

U.S. Pat. Nos. 3,069,927; 3,253,464 and 4,040,296 show rather complicated devices in which the motion of the element bearing the tangent post is guided to insure linearity of movement. All of these prior art devices, while reasonably effective to achieve their basic purpose for temperature compensation, nevertheless, present complicated and relatively expensive devices for doing so. U.S. Pat. No. 2,368,289 shows an instrument for an automobile panel comprising two opposite acting bimetals which are serially connected. The first bimetal is used to sense changes in the engine temperature or other parameter to be measured, the second bimetal being employed to produce an adjustment for changes in ambient temperature. There is no teaching of linearity of movement of the free end of the sensing element and the movement of the free end is, in fact, non-linear.

U.S. Pat. No. 1,848,952 shows a similar automobile instrument and discloses bourdon tube and a bimetal in series, the bourdon tube sensing the temperature of the engine oil. The function of the bimetal is not clearly disclosed but, apparently, it compensates for changes in ambient temperature in the same manner as disclosed in U.S. Pat. No. 2,368,289.

U.S. Pat. No. 2,043,834 discloses two bimetals connected to a rod in opposition to each other. However, the bimetals are not connected between a fixed and linearly movable point as is required in a temperature compensator for a gas meter.

SUMMARY OF THE INVENTION

Applicant has provided a simple, inexpensive and effective arrangement of bimetallic elements and one in which linearity of radial adjustment motion is achieved without the necessity of providing specific means to guide the travel of the tangent post. This has been done by providing two bimetallic elements which are serially connected between the tangent post and the drive shaft, the bimetallic elements being arranged so that each element has a temperature response in opposition to the other but the movement of each of which is cumulative with the other. In one form of the invention, the bimetallic elements are U-shaped and one leg of each is connected together to form a substantially closed loop, the free ends of the loop being juxtaposed to each other. By connecting one free end to the tangent post and the other to the drive shaft, the elements being connected so that their temperature response is in opposition to each other but the movement produced by each is in the same direction, Applicant has provided an effective temperature responsive element which provides essentially linear radial adjustment movement of the tangent post.

DESCRIPTION OF THE PREFERRED EMBODIMENT

The invention herein may be used with a gas meter of the general type described in detail in the U.S. Pat. to Gilmore, No. 2,544,655. The gas meter shown and described therein employs two bellows or diaphragms which together with the body within which they are contained provide four measuring chambers into which the gas is sequentially admitted and exhausted by control valves to cause the measuring chambers to expand and contract as the gas passes through the gas meter. The diaphragms are connected to flag rods which are caused to oscillate by the motion of the diaphragms which, in turn, drive levers in a similar oscillating motion.

Figure 1:
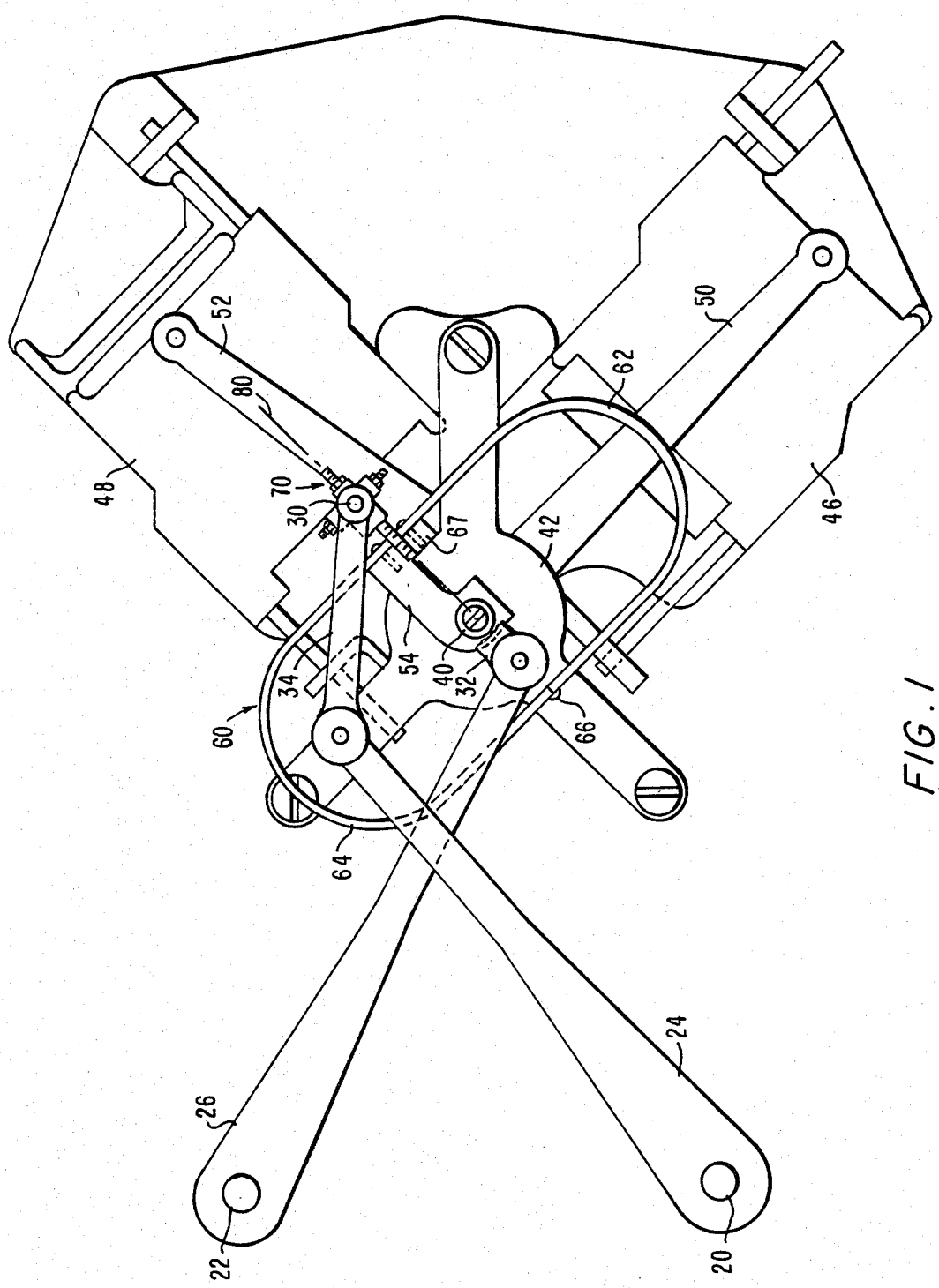
FIG. 1 is a top plan view of certain working elements of a gas meter showing their relationship with the temperature compensator which is the subject of the invention herein.

In FIG. 1 the flag rods are identified by the numerals 20 and 22 and as shown are drive connected to a tangent post 30 respectively by lever 24 and link 34 and lever 26 and link 32. Only a portion of link 32 is shown since it is cut-away to show the mechanism beneath it. It will be understood that links 32 and 34 are respectively rotatably connected to the ends of levers 24 and 26 at one end and at the other end are rotatably connected to the tangent post 30. A drive shaft 40 is journalled in a mounting bracket 42 and is drive connected to the meter index and has a crank portion, not shown, which is drive connected to slide valves 46 and 48 through arms 50 and 52 in a manner well known in the art and as shown in said U.S. Pat. No. 2,544,655. Arm 54 is mounted for rotation with shaft 40.

The temperature sensing element is denoted generally by the numeral 60 and is comprised of two serially connected bimetallic elements 62 and 64 welded together at junction point 66. Each element is comprised of two layers of different metal, each layer having a different coefficient of expansion as will be explained in more detail below. One end of the element 62 is secured to the end of arm 54 by any convenient means such as rivets, while a block 67 is secured to the free end element 64 by a similar means.

Figure 3:
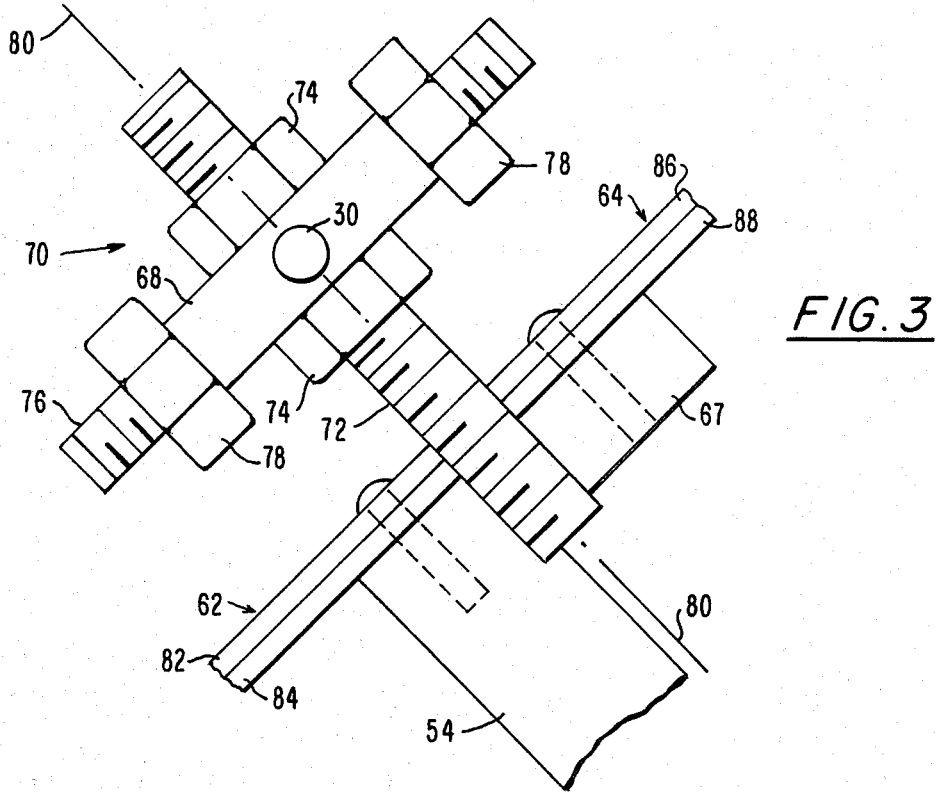
FIG. 3 is an enlarged detailed view of the area encircled in FIG. 2.

As best shown in FIG. 3, a tangent assembly 70 is comprised of a body 68 which may be adjusted radially along screw 72 by adjustment of nuts 74. The body 68 may also be adjusted laterally along screw 76 by adjustment of nuts 78. The tangent post 30 projects upwardly from body 68.

The tangent assembly 70 may be mounted on the free end of the element 64 by means of soldering or welding the screw 72 to the block 67. Thus, the tangent assembly 70 and the post 30 are free to move with the free end of the element 64 while the other end of the essentially closed loop, i.e. the end of element 62, is fixed to the end of arm 54.

As is well understood in the art and as described in U.S. Pat. No. 2,544,655, as the diaphragms are sequentially displaced back and forth by the passage of gas through the meter, the arms 24 and 26 will be caused to oscillate about the axes of flag rods 20 and 22. This movement of the arms 24 and 26 will, through the links 32 and 34, drive the tangent assembly 70, the temperature compensator assembly 60 and the arm 54 in a circular path about the axis of shaft 40. As explained above, rotation of the shaft 40 controls the valves 46 and 48 to sequentially admit gas into the diaphragm chambers to cause the diaphragms to expand and contract and also drives the meter register to provide an indication of the volume of gas passed through the meter. When the meter is assembled during manufacture, it is calibrated by comparing the registration on the meter register with the amount of gas passed through a prover with which it is connected in series. The percent of registration of the meter is adjusted by adjusting the tangent post along a line radial to the axis of screw 72. This line is identified by the numeral 80 in FIGS. 2 and 3. The timing of the valves 46 and 48 may be adjusted by adjusting the post laterally along the axis of screw 76.

It will readily be understood that as the tangent post 30 is moved radially of the axis of shaft 40, the magnitude of the arc through which the arms 24 and 26 move about the axis of flag rods 20 and 22 will be changed which, in turn, will change the amount of displacement of the diaphragms in the meter. Thus, by adjusting the position of the tangent post 30 along line 80, the amount of gas passed through the meter for each revolution of the drive shaft 40 may be changed. As the tangent post is moved outwardly, the amount of gas passed through the meter for a revolution of the shaft 40 will increase, while adjustment of the post 30 radially inwardly will decrease the displacement and the volume of gas passed through the meter for each revolution of the shaft 40.

At the time the meter is assembled, the meter is calibrated by adjusting the tangent 70 and post 80 along the axis of the screw 72 to show registration of the given volume of gas, e.g., 1 cubic foot, at a temperature of 60°, i.e., when the temperature of the gas is 60°, the meter will show 1 cubic foot for a given number of revolutions at the shaft 40. However, as explained above, as the temperature of the gas varies, its energy content will also vary. Thus, in order for the meter to register a volume of gas which at 80° F. will provide the same amount of energy as the gas at 60° F., the tangent post will have to be moved outwardly along line 80 so that the displacement of the diaphragms or the amount of gas passed through the meter is increased for each revolution of the shaft 40. Conversely, if the temperature should decreae, the post 30 must be moved radially inwardly to cause the meter to pass less gas for each revolution of the shaft 40 since at the lower temperature the gas is more dense and provides more energy for a given unit of volume.

It is important that the movement of the post 30 be on a line which is radial to the axis of shaft 40 and that the movement be as linear as possible. Any significant curvelinear movement of the post would introduce inaccuracies in the readings since the increase or decrease of the registration of the meter for a given volume of gas passed through the meter would not vary linearly with the increase or decrease of the temperature and would adversely affect the timing of the valves as set at the time of production. Prior art temperature compensators provide for this linearity either by arranging two bimetals in parallel which provides only limited tangent post adjustment, such as shown in the patent to St. Clair, U.S. Pat. No. 3,119,264, or by providing relatively complicated guiding structures, such as shown in U.S. Pat. Nos. 4,040,296 and 3,253,464. The instant invention provides a wide range of movement for a given temperature change with a relatively uncomplicated arrangement.

Figure 2:
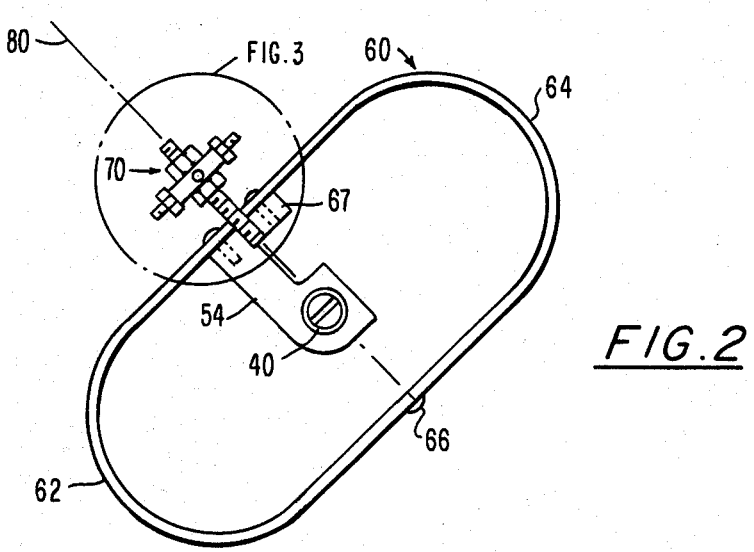
FIG. 2 is a top plan view of the temperature compensator shown apart from the other elements of the gas meter with which it is used as shown in FIG. 1.

Referring to FIGS. 2 and 3, bimetallic element 62 is comprised of two layers of different metals each of which has a different coefficient of expansion from the other so that if one end of the element is fixed and the element is subjected to temperature variations, the free end of the element will be caused to move as a result of the temperature variations. Element 62 is comprised of two layers of metals 82 and 84, layer 82 having the larger coefficient of expansion. Thus, as the temperature increases, the loop formed by the element 62 will tend to close and move the junction point 66 inwardly toward the axis of shaft 40. This, of course, moves element 64 in a direction to move the tangent post 30 away from the axis of shaft 40.

The element 64 is similarly comprised of two layers of metal 86 and 88, the metal of layer 88 having the larger coefficient of expansion. Therefore, an increase in temperature will cause the loop formed by element 64 to open and to move the tangent even further away from the axis of shaft 40. Since the bimetallic strips 86 and 88 are reversely oriented with respect to the orientation of strips 82 and 84 of element 62, element 62 will produce the opposite response to changes in temperature. Thus, when an increase in temperature causes element 62 to close the loop, an increase in temperature will cause the element 64 to open its loop. Closure of the loop formed by element 62 will tend to move the post 30 away from the axis of shaft 40 and opening of the loop formed by element 64 will tend to move the post 30 even further away from said axis. Thus, the motion produced by each loop when connected together in series with their layers reversely oriented with respect to coefficient of expansion is cumulative and linear.

Since the element 64 is serially connected to element 62 and the free end of the element 62 is secured to the arm 54, as the point 66 moves toward or away from the axis of shaft 40 as a result of temperature changes, it will move in a path which is slightly arcuate. If the point 66 were held stationary, the path of movement of the free end of element 64 with respect to point 66 would also be slightly arcuate with a curvature opposite to the path described by the point 66 when it is free to move. Thus, the curvature of the path of point 66 with respect to the axis of shaft 40 is compensated for by the curvature of the path of movement of the free end of element 64 with respect to point 66 so that the net effect of the entire system is to produce a path of movement for the free end of the element 64 and the tangent post 30 which is essentially linear and radial to the axis of shaft 40. In the orientation described above, i.e. with the strips 82 and 88 having a coefficient of expansion larger than strips 84 and 86, increases in temperature will move the tangent post radially outward under the influence of temperature increases and radially inward under the influence of temperature decreases. In either direction, however, the radial movement of the post 40 will be the summation of the purely radial movement produced by each of the elements 62 and 64.

If it is desired to increase the rigidity of the system, a second set of strips may be provided with parallel strips 62 and 64 and their individual strips would have the same reverse orientation as that of the strips 62 and 64. By orienting the elements 62 and 64 so that the space between their legs is coextensive to form an essentially closed loop, a versatile design is produced in that the rigidity of the system may be increased by providing a second pair of elements similar to elements 62 and 64 in parallel with elements 62 and 64 to provide an essentially closed loop within the loop formed by elements 62 and 64, the second set of elements being oriented to produce the same response to temperature changes as that produced by the loop formed by elements 62 and 64. Such a second pair of elements would be difficult to utilize if the elements 62 and 64 were oriented in "S" shaped configuration.

Alternatively, the thickness of the individual strips 82, 84, 86, 88 could be increased to provide added rigidity to the system.

We claim:

1. A temperature compensated gas meter having displacement members adapted to be displaced by the flow of gas through said meter, a rotatable drive shaft drive connected to a meter register, a tangent post mounted for orbital movement about the axis of said drive shaft, said displacement members being drive connected by motion transmitting linkage to said tangent post to drive said tangent post in orbital movement around the axis of said drive shaft, temperature responsive means for varying the radius of movement of said tangent post about the axis of said drive shaft in accordance with variations in the temperature of the gas comprised of at least two serially connected bimetal elements extending between said tangent post and said drive shaft, said bimetal elements being oriented whereby each element responds to a given temperature change to produce movement in the same direction as the other with respect to the axis of said shaft.

2. The gas meter defined in claim 1, in which said temperature responsive means is comprised of a substantially closed loop having adjacent free ends, one free end being connected to said tangent post, the other free end being drive connected to said drive shaft.

3. The gas meter defined in claim 2, in which said loop is comprised of two U-shaped members one of the legs of one of said members being secured to one of the legs of the other.

4. The gas meter defined in claim 1, in which said bimetallic elements are U-shaped members one of the legs of each of which are secured together to form a loop.

5. The gas meter defined in claim 1, in which said temperature responsive means is comprised of a first pair of U-shaped bimetallic elements one of the legs of each of which are secured together to form a first substantially closed loop, and a second pair of U-shaped elements one of the legs of each of which are secured together to form a second substantially closed loop within said first loop.

6. A temperature compensated gas meter having displacement members adapted to be displaced by the flow of gas through said meter, a rotatable drive shaft drive connected to a meter register, a tangent post mounted for orbital movement about the axis of said drive shaft, said displacement members being drive connected by motion transmitting linkage to said tangent post to drive said tangent post in orbital movement around the axis of said drive shaft, temperature responsive means for varying the radius of movement of said tangent post about the axis of said drive shaft in accordance with variations in the temperature of the gas, comprised of a first pair of serially connected U-shaped bimetallic elements extending between said tangent post and said drive shaft, one of the legs of each of which elements being secured together to form a first loop, and a second pair of serially connected U-shaped bimetallic elements extending between said tangent post and said drive shaft to form a second loop in parallel with said first loop, the bimetallic elements of each pair being reversely connected to each other whereby one element within a pair responds to a given temperature range to produce a movement in a direction opposite to the movement produced by the other element in the same pair.

7. A temperature compensated gas meter having displacement chambers containing displacement members displaced by the flow of gas through said meter, a drive shaft journaled for rotation and drive connected to a meter register, said displacement members being connected by motion transmitting linkage to a tangent post to drive said tangent post in orbital movement about the axis of said drive shaft, temperature responsive means for varying the radius of movement of said tangent post about said drive shaft comprising a closed loop comprised of first and second U-shaped bimetal elements serially connected together at one leg of each element, said first element being adapted to produce displacement of the legs of said element toward each other with an increase of temperature and said second element being adapted to produce displacement of the legs of said element away from each other with an increase of temperature.

8. The invention defined in claim 7, in which the free leg of said first element is drive connected to said drive shaft and said tangent post is carried by the free end of said second element.

* * * * *